Aug. 5, 1969  D. A. FISCHLER  3,459,843
METHOD OF FORMING PEARLESCENT ARTICLES
OF PATTERNED ORIENTATION
Filed Oct. 5, 1966

INVENTOR.
DANIEL A. FISCHLER
BY
Mark Bassieches
ATTORNEY

United States Patent Office 3,459,843
Patented Aug. 5, 1969

3,459,843
METHOD OF FORMING PEARLESCENT ARTICLES
OF PATTERNED ORIENTATION
Daniel A. Fischler, New Hyde Park, N.Y., assignor to
Emsig Manufacturing Corp., New York, N.Y., a corporation of New York
Filed Oct. 5, 1966, Ser. No. 584,478
Int. Cl. B28b 1/30; B29b 19/02, 19/04
U.S. Cl. 264—108     3 Claims

ABSTRACT OF THE DISCLOSURE

A method of forming patterned orientation in articles having integral sheen comprising subjecting a substantially hardened pearlescent article to pressure exerted through a heterogeneously compressible structure which thereupon acts as a carrier for the articles.

---

This invention relates to a method of producing pearlescent plastic material, and more particularly to a method of simultaneously producing a multiplicity of thermo-setting, pearlescent plastic articles, such as butt on blanks or the like, having a unique, heterogeneous pearly orientation.

Still more particularly, this invention relates to a method of producing, by molding in a gang mold, multiplicity of pearlescent plastic blanks of unique, non-homogeneous pearly appearance.

Pearly appearing articles of plastic have heretofore been produced in accordance with two general methods. In accordance with the first method, a liquid resinous mix containing nacreous material is cast either between sheets of glass or in a drum and cured. In the sheet casting or drum casting method, the liquid resin is caused to flow over the surfaces of the drum or sheet, said flow causing a laminar turbulence in the layer of the resin mass immediately adjacent the sheet or drum, which turbulence causes the flake-like nacreous or metallic material to become aligned with its broad faces substantially parallel with the surface of the sheet or drum. The plastic mass is subjected to hardening or polymerizing influences and, typically, is removed from between the glass sheets or from the drum in a semi-rigid condition.

A plurality of individual articles, such as button blanks, are thereafter stamped from the sheet in advance of hardening of the sheet, or sawed from the sheet after hardening, the blanks presenting a highly decorative, generally homogeneous pearly appearance.

The thus produced blanks, where they are to be used as buttons or in analogous situations, are turned or cut to shape, polished, etc.

In accordance with the second method referred to above a liquid, thermo-setting resin is compression molded in a gang or multiple mold under heat and pressure between die plates having cavities therein, which cavities are configurated to result in the production of articles of predetermined shape.

In accordance with this method, the thermo-setting resinous material should be partly cured prior to molding so that the material is preferably within a range of maximum viscosity prior to gelation as the mold parts close.

In this method, wherein flexible barrier sheets, such as cellophane, polyvinyl alcohol, Mylar, are typically interposed between the resinous mass and the mold parts, the pearl or flake filler material suspended in the resin becomes oriented in the course of its flow to final position within the mold cavities.

In general, it has been found that the pearly appearance evidenced by articles manufactured by molding is superior to the appearance of cast articles manufactured in accordance with the first method above noted since, in such molded articles, the pearly appearance is heterogeneous rather than homogeneous. By "heterogeneous" it is meant that the pearl or flake material in the course of molding assumes a wavy, ripple-like or intermittent orientation which more nearly approaches the appearance of natural mother-of-pearl than the homogeneous, generally flat or non-wavy orientation achieved by casting between glass or within a drum.

As a result of their more attractive appearance, and in part also due to the fact that the molding operation is inherently more expensive than the casting operation, molded articles such as buttons have generally commanded a higher price in the market than cast articles.

In accordance with the present invention, cast blanks, such as button blanks, are economically treated in a manner which renders their appearance similar to molded blanks.

In accordance with the method of the invention, the homogeneous orientation of a cast blank is altered, rendering the appearance of the blank very similar to the heterogeneous and generally more desirable orientation of molded blanks. If desired, a degree of shaping of the cast blanks may be achieved in the course of the pearl reorientation.

Basically, the method of the present invention comprises forming a multiplicity of thermo-setting, pearly plastic blanks by one of the casting processes noted above, the blanks being separated from the initially formed sheet by punching while the sheet is still in its so-called "B" stage. By the "B" stage is meant the condition of a thermo-setting material after the same has gelled but before final cure.

In this stage, which is traversed by such resins as the unsaturated polyesters, the resin mass, while not flowable in the ordinary sense, can be deformed. The homogeneous, pearl-oriented blanks, while still in the "B" stage, are disposed within a compression mold and, where the blanks are to be further shaped, are disposed within female cavities formed in a mold or die plate. To the surfaces of the blanks not engaging the die plate, typically the upper surfaces, there is applied a sheet of absorptive, particulate, heterogeneously compressible material, such as cardboard, and more especially bogus board, chip board or the like.

After the application of such sheet, a second die plate applies a pressure to the article blanks through the cardboard or other sheet, the pressure being sufficient to cause the article blanks to be deformed and assume the contours, if any, of the female mold cavities.

Since the pressure is applied to the surfaces of the articles through the cardboard or like sheet, which preferably is variably compressible due to its heterogeneous and particulated interior structure, various pressures are applied to different surface areas of the article blanks. The uneven pressures thus applied to the article blanks result in a reformation of the orientation pattern of the theretofore homogeneously oriented pearl material within the article blanks, so as to give to the finished, cast blanks an appearance not unlike that of a molded blank.

A principal advantage of the present method lies in the tendency of the thus-processed blanks gently to adhere to the cardboard sheet, permitting the compressed blanks to be removed as a unit from the mold by the removal of the cardboard sheet. Since the blanks are exposed to the cardboard only after they have reached their "B" stage, there is only a light adhesion to the cardboard, which adhesion is mechanical in its nature, resulting from the distortion of the blank surfaces to conform to the uneven face of the cardboard resulting from its compression in the mold. In other words, due to the fact that cardboard is comprised of disparate, particulate masses, when the cardboard is compressed against a deformable surface, such as the article blanks in the "B" stage, the cardboard surfaces engaging such blanks, which might be initially flat, will assume a non-uniform conformation. This characteristic permits the pearl re-orientation in the plastic and likewise permits the mechanical adhesion of the plastic to the cardboard, enabling the ready emptying of the mold cavities without the necessity for individually blowing the cavities or the use of complex molds which include knock-out pins or the like.

The adhesion of the articles to the cardboard is mild and the articles may be readily removed from the sheet by passing the cardboard through a wiper mechanism which readily admits the thickness of the cardboard but blocks the article blanks supported thereon from passing beyond a fence or the like.

Accordingly, it is an object of the invention to provide an improved method of manufacturing articles, and particularly buttons, having a wavy, pearl-like appearance.

A further object of the invention is the provision of a method for forming in cast blanks, the pearly appearance of the type resembling that obtained in synthetic pearly articles manufactured by a compression molding process.

A still further object of the invention is the provision of a method for shaping cast resinous articles of partially cured thermo-setting material having integral sheen and at the same time disturbing or interrupting the regular or integral sheen to obtain desirable ripple or pebble-like effects.

Still a further object of the invention is the provision of a method for molding a multiplicity of plastic articles in a gang mold, whereby the operation of removing the articles from the mold is greatly facilitated.

To attain these objects and such further objects as may appear herein or be hereinafter pointed out, reference is made to the accompanying drawings forming a part hereof, in which.

Figure 1:
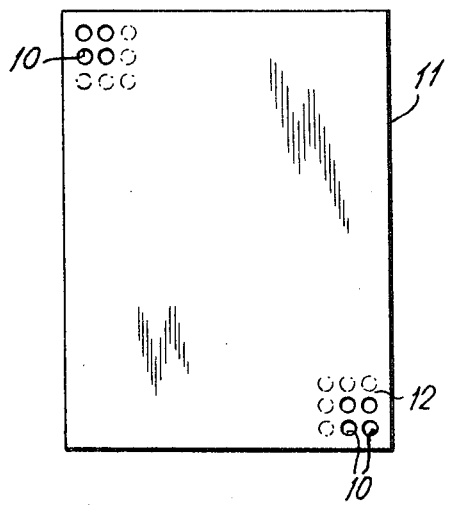
FIGURE 1 is a plan view of a die plate of a compression molding apparatus.
Figure 2:
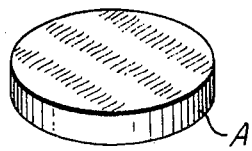
FIGURE 2 is a perspective view of a disk or button blank exhibiting integral pearly sheen.
Figure 3:
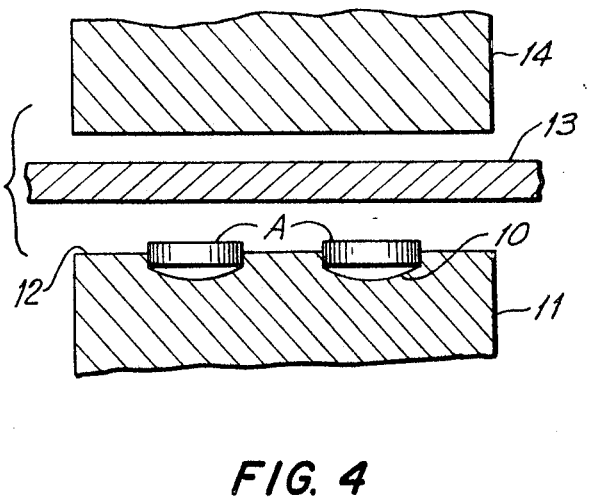
FIGURE 3 is a diagrammatic sectional view of the apparatus for practicing the method of the present invention.

In accordance with the invention, the starting material employed for further fabrication comprises cast article blanks having integral pearly sheen, such a blank being illustrated in FIGURE 2. While it is impossible to depict in the drawings, the article blank A presents an integral pearly sheen. By the term "integral pearly sheen" it is meant that the article presents an appearance which is generally homogeneous, comprising an over-all pearl-like luster, although a wavy luster is also suitable.

The method is particularly adapted for use in simultaneously fabricating a multiplicity of article blanks A formed of a thermo-setting resinous material.

The method by which the article blank or starting blank is formed is not critical to the present invention, suitable pearly blanks being formable by any of a number of known casting processes which are effective to orient the pearly material and the resinous mass in a homogeneous fashion, so that the blank possesses integral sheen. Examples of satisfactory methods include casting between sheets of glass and casting within a drum or cylinder which is being rotated about a horizontal axis.

A suitable polyester casting mixture may be constituted as follows:

90 parts by weight Selectron 5014 (constituting a liquid thermosetting polyester resin mixture manufactured by Pittsburgh Plate Glass Co.)

10 parts by weight Selectron 5238 (constituting a flexible polyester resin mix manufactured by Pittsburgh Plate Glass Co.)

.02 part by weight of a 6% solution of cobalt naphthanate dissolved in a non-reactive organic solvent compatible with polyester. (A suitable product is manufactured by Mooney Chemical Co.)

1.5 parts by weight Lupersol DDM (a catalyst constituting a 60% methylethylketone peroxide and 40% dimethylphthalate as manufactured by Wallace & Tiernan, Inc., Lucidol Division.)

2½ parts by weight of synthetic pearl essence comprising basic lead carbonate lamellae in a suitable dispersing agent, a suitable product being available under the trade name Z.P.G. Nacromer from the Mearl Corporation.

All of the ingredients, with the exception of the Lupersol DDM may be mixed together, with the Lupersol component being admixed just prior to use.

After the addition of the Lupersol (catalyst), the casting mixture may be treated in any of the known manners utilized to orient the lamellae of the pearl component so that the broad surfaces of the pearl crystals are aligned generally in parallelism with the sheets of glass, where the material is cast between glass sheets, or with the cylinder surface of the drum, where a centrifugal casting apparatus is employed.

The mass of resin is permitted to cure until the resinous mass reaches a stage at which it can be handled, i.e. a stage at which the mass is still flexible and yet sufficiently coherent as not to fall apart when handled. I have determined that about 30 to 35 minutes at about 70° F. provides a sufficient cure for the resin mix.

Preferably the resinous mass is removed from the mold when it has attained a Shore A hardness of about 40 to 50. The sheet of pearly plastic is still flexible and generally leathery at this stage and, as is well known, article blanks may be formed therefrom by punching or otherwise cutting disks of the desired size from the sheet.

The disks thus formed are subjected to the further processing steps which are the subject of the present invention.

The disks A, which may be aptly described as being in the so-called "B" stage of polymerization, are introduced into cavities 10 formed in the face of a die plate 11. Optionally, to facilitate the loading operation, a so-called loading board may be employed, the board comprising an apertured holder for receiving a multiplicity of disks A, the apertures in the loading board being spaced to correspond with the die cavities 10 in the plate 11. The board may be positioned over the plate and a floor or undersurface in the loading board actuated to release the articles A to the die plate.

Preferably, the cavities are of slightly greater overall volume than the volume of the articles A. Also, the depth of the cavities is preferably such that the articles deposited thereon will project at least slightly above the surface 12 of the die plate.

While the exact Shore hardness at which the articles are punched or otherwise removed from the sheet is not critical, it is an important feature of the invention that the Shore hardness of the article blanks, when the same are processed in the mold, be within the range of a Shore A hardness of about 40 to about 85. Since the materials of the formula hereinabove set forth are constantly polymerizing, it will be appreciated that the timing of removal of the items from the sheets or drum, stamping out and loading into the mold must be carefully controlled, to assure that the articles in the mold are within or close to the critical range of hardness.

After the articles are charged into the mold, there is placed over the upper surfaces of the articles a heterogeneously compressible sheet. The term "heterogeneously compressible" refers to the characteristic of being non-uniform in constitution, with a consequent differential transmission of pressures applied through it. As examples of suitable heterogeneously compressible sheets there may be cited bogus board, chip board, and other cardboards of particulate structure.

In general, sheets made from highly calendered or highly sized materials will be unsuitable or less suitable for use in the process whereas the cardboard materials relatively free from sizing and relatively highly compressible and of particulate structure are better suited for the process.

It will become evident from the further description of the process that the suitability or non-suitability of a material is a function of many factors. As a practical matter, the determinant of success of any selected compressible sheet is its ability, when subjected to pressure of the magnitude hereinafter set forth, to induce in the pearly article a sufficient disruption of the integral or regular sheen of the article to produce the desired wavy pattern.

Thus, it will be evident that a highly calendered and highly sized material, such as oak tag, may induce some disruption of the pearly sheen but normally such disruption will not be sufficient materially to change the appearance of the article from an article having integral sheen. On the other hand, the use of bogus board, which is relatively highly compressible and contains randomly disposed and randomly sized particulate matter, will be sufficient materially and strikingly to disrupt the integral sheen, desirably to modify the same.

Figure 4:
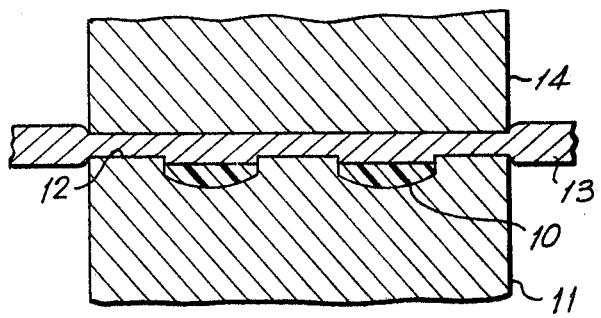
FIGURE 4 is a diagrammatic sectional view of the apparatus of FIGURE 3 in an advanced stage of the operation.
Figure 5:
FIGURE 5 is a sectional view showing the articles resulting from the practice of the process supported on a carrier sheet.

The heterogeneously compressible sheet 13 is disposed over the articles A and beneath the platen 14 of a press. The die plate 11 and the platen 14 are moved toward each other, to exert a pressure of about 800 p.s.i. to the articles through the sheet 13, at a temperature of about 300° F. As a result of this pressure, the articles A are forced into the die cavities 10 and, by reason of the compressibility of the sheet 13, increments of the sheet 13 which are in registry with the cavities are also forced into these cavities. The position of the parts after application of pressure is shown in FIGURE 4.

The articles, while still in the "B" stage and within the range of hardness hereinabove mentioned, are sufficiently plastic to be deformed by application of the above noted pressures and moderate modeling or shaping of the articles may be induced.

The press is then opened and the articles may be simultaneously removed from the cavities by removal of the sheet 13. The adherence of the articles to the sheet is an important advantage of the process since it permits a simple die plate to be employed, without the necessity for providing knock-out pins, barrier sheets and like mold releasing expedients.

When the Shore hardnesses above referred to are followed, the bond between the articles and the sheet is exclusively mechanical in nature and is easily broken. Thus, it is assured that the articles may be separated from the sheet without any likelihood of portions of the sheet separating therefrom and remaining on the articles, and without the application of undue removing forces. A preferred way of removing the articles is by drawing the sheet between spaced-apart linear members which provide sufficient clearance for the sheet but not for the combined thickness of the sheet and articles.

Figure 6:
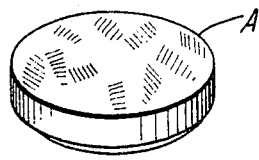
FIGURE 6 is a perspective view similar to FIGURE 2 showing the appearance of the article resulting from the practice of the process.

The hardened and cured article blanks resulting from the practice of the process are shown in FIGURE 6, wherein an attempt has been made to show the pebbled or wavy nature of the pearly sheen in the finished article.

Often the surface of the article A which is in contact with the sheet is slightly indented or uneven. Where desired such unevenness may be removed by polishing or tumbling the molded articles in accordance with known practice. It will be understood that such polishing or tumbling operations will not interfere with the wavy or pebbled pearly appearance of the completed articles.

The invention is not to be taken as limited to any specific molding composition or heterogeneously compressible sheet but, rather, is to be broadly interpreted within the scope of the appended claims, to apply to a method which includes the steps of reorienting the pearly appearance of an article blank having an initial integral pearly sheen through the use of pressure applied through a heterogeneously compressible sheet which is, by the action of such pressure, temporarily but lightly appended to the articles.

While the present invention has been illustrated in connection with an apparatus having a generally flat upper die plate, it will be appreciated, particularly where a relatively deep draw is desired, that plunger mechanisms shaped to correspond with the die cavities in the lower mold part may depend from the upper mold plate 14, without departing from the spirit of the invention.

Similarly, where it is desired to obtain more or less predictable effects, it is possible to interpose between the upper die plate and the cardboard sheet, a layer such as a screen, fabric or the like, having a three dimensional characteristic. When such an inter-layer is employed, the resulting article will be modified whereby the pearl orientation will reflect the pattern of the inter-layer. Thus it is within the spirit of the invention to modify the procedures set forth by utilizing an inter-layer member.

Having thus described the invention and illustrated its use, what is claimed as new and is desired to be secured by Letters Patent is:

1. The method of manufacturing shaped pearly plastic articles having discontinuous sheen which comprises the steps of providing a plurality of generally disk-shaped, thermo-setting plastic article blanks having integral sheen, said blanks being polymerized to a Shore A hardness of about 40 to about 85, disposing said articles in the cavities of a die plate, the volume of said cavities being greater than the volume of said blanks, the depth of said cavities being less than the thickness of said blanks, whereby a surface of said blanks is exposed above said die plate, contacting said exposed surfaces of said blanks with a sheet of heterogeneously compressible structure, thereafter heating said articles on said plate and applying a pressure to said exposed surfaces through said sheet, said pressure being sufficient to cause said blanks to conform to the confines of said cavities and to introduce increments of said sheet into said cavities, and thereafter removing said articles from said cavities by using said sheet as a carrier, said articles having been removably secured to said sheet by said pressure.

2. The method of claim 1 wherein said sheet comprises cardboard of particulate structure.

3. The method of claim 1 wherein said material comprises bogus board.

References Cited

UNITED STATES PATENTS

| | | | |
|---|---|---|---|
| 1,806,863 | 5/1931 | Paisseau | 264—297 X |
| 2,652,597 | 9/1953 | Sucher | 264—316 X |
| 2,722,720 | 11/1955 | Karniol. | |
| 3,064,312 | 11/1962 | Bronfman. | |
| 3,075,249 | 1/1963 | Sucher. | |
| 3,305,618 | 2/1967 | Sucher et al. | |

FOREIGN PATENTS 701,750   1/1965   Canada.

OTHER REFERENCES

Bacon, Method and Apparatus for Molding Materials, Abstract No. 610,591, vol. 626, O.G. 871, Sept. 20, 1949.

ROBERT F. WHITE, Primary Examiner

N. RUSHEFSKY, Assistant Examiner

U.S. Cl. X.R.

264—297, 316, 320